(12) United States Patent
Haddad (10) Patent No.: US 8,428,024 B2
(45) Date of Patent: Apr. 23, 2013

(54) SYSTEM AND METHOD FOR MOBILITY WITH A SPLIT HOME AGENT ARCHITECTURE USING MPTCP

(75) Inventor: Wassim Haddad, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 310 days.

(21) Appl. No.: 12/969,229

(22) Filed: Dec. 15, 2010

(65) Prior Publication Data

US 2012/0020284 A1 Jan. 26, 2012

Related U.S. Application Data

(60) Provisional application No. 61/366,314, filed on Jul. 21, 2010.

(51) Int. Cl.
*H04W 28/16* (2009.01)
*H04W 40/12* (2009.01)
*H04W 40/34* (2009.01)
*H04W 4/00* (2009.01)

(52) U.S. Cl.
USPC .............. 370/329; 455/452.2; 455/432.1; 709/228; 709/239

(58) Field of Classification Search ........... 370/237, 370/328, 329, 331, 332; 455/432.1, 435.1, 455/436, 443, 452.1, 452.2; 709/228, 239
See application file for complete search history.

(56) References Cited

U.S. PATENT DOCUMENTS

| | | | | |
|---|---|---|---|---|
| 6,973,057 B1 * | 12/2005 | Forslow | ............. | 370/328 |
| 7,519,738 B2 * | 4/2009 | Forsberg | ............. | 709/245 |
| 8,077,695 B2 * | 12/2011 | O'Neill | ............. | 370/349 |
| 8,125,954 B2 * | 2/2012 | Wu | ............. | 370/331 |
| 8,230,076 B2 * | 7/2012 | Weniger et al. | ............. | 709/227 |
| 2011/0252151 A1 * | 10/2011 | Lu et al. | ............. | 709/228 |
| 2012/0023211 A1 * | 1/2012 | Haddad | ............. | 709/223 |

FOREIGN PATENT DOCUMENTS

EP 2129056 12/2009

OTHER PUBLICATIONS

*3GPP:* "3rd Generation Partnership Project; Technical Specification Group Services and System Aspects; 3GPP system to Wireless Local Area Network . . ." vol. SA WG2; Nov. 19, 2002; 11 pages.
Wakiawa R. et al.: "*Inter Home Agents Protocol (HAHA)*"; Internet Citation; Feb. 16, 2004, p. 8, paragraph 3; http://www.mobilenetworks.org/nemo/drafts/draft-wakikawa-mip6-memo-ha_ha-01.txt.

(Continued)

*Primary Examiner* — Chi Pham
*Assistant Examiner* — Ahmed Elallam
(74) *Attorney, Agent, or Firm* — Blakely Sokoloff Taylor & Zafman, LLP (57) ABSTRACT

A method implemented in a network element functioning as a home agent (HA) for a mobile node (MN) communicating with a corresponding node (CN) using Mobile Internet Protocol version 6 (MIPv6), the method including selecting by the HA a virtual home agent (VHA) to provide home agent services to the MN with a better quality of service than the HA based on pre-defined policies, sending a flow switch request (FSR) message to the selected VHA, the FSR message including transmission control protocol (TCP) parameters and the FSR message including a care-of address for the MN and an address of the CN, the FSR message to initiate a flow redirection at the VHA using multi-path TCP exchange, and receiving a flow switch acknowledgement (FSA) message from the VHA indicating that the VHA is receiving data packets from the CN and tunneling the data packets to the MN at the care-of address.

14 Claims, 6 Drawing Sheets

OTHER PUBLICATIONS

Aura, T., "Cryptographically Generated Addresses (CGA)", *Network Working Group: Request for Comments: 3972; Category; Standards Track*, 22.

Johnson, D.,o et al., "Mobility Support in IPv6", *Network Working Group; Request for Comments: 3775; Category: Standards Track*, (Jun. 1, 2004), 165.

* cited by examiner

SYSTEM AND METHOD FOR MOBILITY WITH A SPLIT HOME AGENT ARCHITECTURE USING MPTCP

The present application claims priority from U.S. Provisional Patent Application No. 61/366,314, filed on Jul. 21, 2010 and also is cross referenced with the co-pending application entitled "SYSTEM AND METHOD FOR PROVIDING MOBILITY WITH A SPLIT HOME AGENT ARCHITECTURE" filed the same date as the present application and commonly owned. The cross referenced application is incorporated herein by reference.

FIELD OF THE INVENTION

Background

The mobile Internet protocol version 6 (MIPv6) allows a mobile device to maintain a continuous connection with another device that supports mobile Internet protocol version 6. Two separate modes of communication are supported with MIPv6: bi-directional tunneling (BT) mode and route optimization (RO) mode. Mobile IPv6 utilizes a home agent node to manage the forwarding of data traffic to a mobile node when that mobile node is not present in a home network.

When a mobile node moves to a foreign network, the mobile node registers in that network and reports the registration back to the home agent node. The home agent node receives data traffic from the corresponding node and forwards the traffic to the mobile node in the foreign network using IP in IP tunneling in BT mode. In RO mode, the home agent facilitates the communication between the corresponding node and the mobile node such that the corresponding node is notified of the new location and the address of the mobile node in the foreign network allowing the corresponding node to directly communicate with the mobile node in the foreign network without interruption to the transmission control protocol (TCP) connections.

In mobile IPv6, the mobile node has a static home agent which serves as an anchor point to ensure a global and continuous reachability for the mobile node regardless of its current topological location (i.e., in the home network or attached to a foreign network). However, the cases where a failure of the home agent occurs or the home agent is overloaded are not solved by mobile IPv6. BT mode is secure and requires a significant amount of signaling messages to establish and maintain the tunnel between the mobile node and home agent. BT mode is also under the mobile node's control. In contrast, the RO mode requires the direct involvement of both the mobile node and corresponding node and requires that more resources be expended in the overhead mobility signaling to establish and maintain the RO mode in comparison with the BT mode.

SUMMARY

A method implemented in a network element in a wide area network, the network element functioning as a home agent (HA) for a mobile node (MN) communicating with a corresponding node (CN) using Mobile Internet Protocol version 6 (MIPv6), the method comprising the steps of: selecting by the HA a virtual home agent (VHA) in the network to provide home agent services to the MN with a better quality of service than the HA based on pre-defined policies; sending a flow switch request (FSR) message to the selected VHA, the FSR message including transmission control protocol (TCP) parameters for a session between the MN and CN and the FSR message including a care-of address for the MN and an address of the CN, the FSR message to initiate a flow redirection at the VHA using multi-path TCP exchange; and receiving a flow switch acknowledgement (FSA) message from the VHA indicating that the VHA is receiving data packets from the CN and tunneling the data packets to the MN at the care-of address, whereby the MN receives a better quality of service when communicating with the CN through the VHA than through the HA.

A network element configured to function as a home agent (HA), the network element configured to communicate with a mobile node (MN), a corresponding node (CN) and a plurality of virtual home agents (VHAs) over a wide area network, the network element comprising an egress module configured to receive data packets over the network; an ingress module configured to transport the data packets over the network; and a network processor communicatively coupled to the ingress module and egress module, the network processor configured to execute a network mobility management module, a binding management module and a virtual home agent module, the network mobility management module configured to manage a communication session between the mobile node and the corresponding node, the binding management module communicatively coupled to the network mobility management module, the binding management module configured to maintain a binding table including a set of binding entries, each binding entry including a correlated care-of address for the MN, an address of the HA, an address of the CN and an address of the VHA, the binding management module configured to create and update the set of binding entries, the virtual home agent management module configured to select a VHA from the plurality of VHAs to provide a home agent service to the MN, the selection based on pre-defined policies, the virtual home agent management module to send a flow switch request (FSR) message to the selected VHA, the FSR message including transmission control protocol (TCP) parameters of a session between the MN and the CN, the FSR message to cause the selected VHA to establish a flow between the MN and CN that passes through the selected VHA using multi-path TCP (MPTCP) exchange, the virtual home agent management module to receive a flow switch acknowledgement (FSA) message from the selected VHA, whereby the MN receives a better quality of service when communicating with the CN through the selected VHA than through the HA.

A network element configured to function as a virtual home agent (VHA), the network element in communication with a mobile node (MN), a corresponding node (CN) and a home agent (HA) over a wide area network, the network element comprising an ingress module configured to receive data packets over the network; an ingress module configured to transport the data packets over the network; and a network processor communicatively coupled to the ingress module and egress module, the network processor configured to execute a network mobility management module, a binding management module and a virtual home agent module, the network mobility management module configured to manage a communication session between the MN and the CN, the binding management module communicatively coupled to the network mobility management module, the binding management module configured to maintain a binding table including a set of binding entries, each binding entry including a correlated care-of address for the MN, an address of the HA, an address of the CN and an address of the VHA, the binding management module configured to create and update the set of binding entries, a virtual home agent module to provide a home agent service to the MN, the virtual home agent module to receive a flow switch request (FSR) message from the HA including TCP parameters of a multi-path TCP (MPTCP) session between the MN and CN, a care-of address of the MN, and an address for the CN, the virtual home agent module configured to use multi-path TCP exchange to establish a flow from the CN to the MN that passes through the VHA, to send a flow switch acknowledgement (FSA) message to the HA and to tunnel data traffic from the CN to the MN, whereby the MN receives a better quality of service when communicating with the CN through the selected VHA than through the HA.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 1 and 4-6. However, it should be understood that the operations of the flow diagrams can be performed by embodiments of the invention other than those discussed with reference to FIGS. 1 and 4-6, and the embodiments discussed with reference to FIGS. 1 and 4-6 can perform operations different than those discussed with reference to the flow diagrams of FIGS. 2 and 3.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

The embodiments of the present invention provide a method and system for avoiding the disadvantages of the prior art. The disadvantages of the prior art include bi-directional tunneling (BT) mode not being optimal when the mobile node is far away from its home network. For example, if a mobile node is in the United States communicating with a corresponding node located in the United States while its home network is in Japan, then all traffic between the mobile node and corresponding node has to go to the home agent in Japan before coming back to the mobile node. The telecommunications landscape is going through a tremendous growth in the real time applications, services and web-enabled high definition television and these type of applications are expected not only to grow but to be also the main driver for telecommunication service operators revenues. Hence, ensuring a high Quality of Service to the customer is important in an increasingly competitive environment. Furthermore, these particular types of applications may lead to a "bottleneck" at the home agent level in which case, all clients will suffer a drop in the service quality.

The embodiments of the invention overcome these disadvantages of the prior art. Instead of deploying a cluster of home agents in a home network, a split control architecture is utilized whereby a central home agent connects to a set of new lightweight virtual home agents (VHAs), which don't deal directly with the mobile node, but are able to provide specific services as requested by the home agent and based on feedback from the mobile node. In addition, virtual home agents can be located anywhere and don't need to exchange direct signaling with the mobile node (i.e., mobility related signaling or other signaling). Instead, virtual home agents aim to offer particular home agent features for the mobile node without the knowledge of the mobile node. The home agent has a secure connection with each virtual home agent and is fully aware of each virtual home agent location.

The split home agent architecture and method is suitable for multi-homed mobile nodes. This means that a mobile node is expected to have at least two different interfaces (e.g., an interface with the line terminal equipment (LTE) and an interface with the (WLAN) in which case, both interfaces are connected to the same operator network (e.g., AT&T, Verizon, T-Mobile and similar operators). This split home agent based architecture provides a better mobility performance than the performance provided by the BT mode.

Consequently, the split home architecture can be described as having one centralized policy control node, which receives input from the mobile node, among others, and makes a decision accordingly. The centralized control node is executed by a home agent node that is connected to a large set of lightweight home agents which serve to create a sort of "location-based" virtual home agent but with no direct relationship with the mobile node. The mobile node updates its home agent with a new care-of address (CoA) and lets the home agent determine the right virtual home agent (in cases where one can be used).

The main benefits of having a virtual home agent are to optimize the data traffic routing, offer a better quality of service (QoS) and offload the services of the home agent whenever needed. Such optimization includes implementing the equivalent of a route optimization mode without requiring the two real endpoints (i.e., mobility node and corresponding node) to deal with each other in terms of exchanging mobility signaling protocols. The virtual home agents can be located anywhere and do not pose a scalability issue. In addition, the home agent can also move sessions from one virtual home agent (VHA) to another depending on the mobile node location so that the mobile node can always be assigned to the closest virtual home agent.

While the MIPv6 RO mode enables a data packet exchange on the direct path between the mobile node and the corresponding node. The split home agent architecture fits between the BT mode and the RO mode and is more beneficial and quicker to implement because it enables the operators to keep full control of the traffic flows while optimizing data packets routing.

Figure 1:
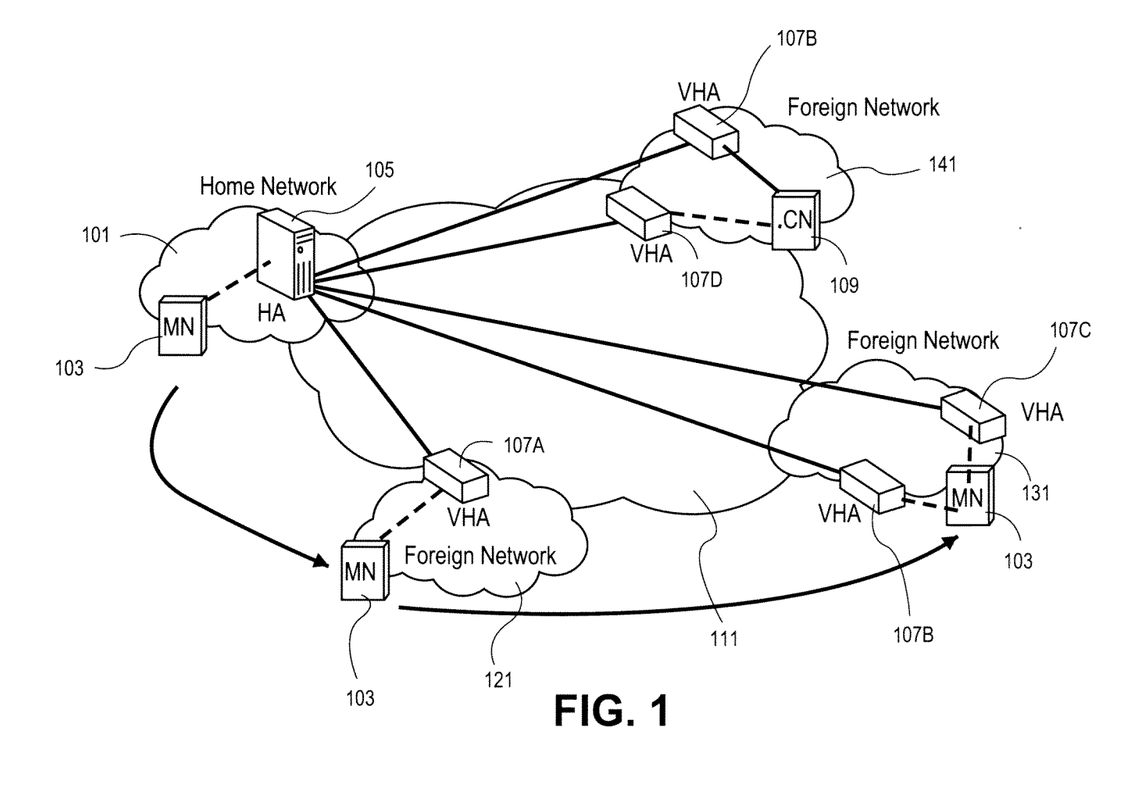
FIG. 1 is a diagram of one embodiment a network implementing the split home agent architecture.

FIG. 1 is a diagram of one embodiment of a network implementing the split home agent architecture. The network includes a mobile node 103, a home agent 105 located in the home network 101, a set of foreign networks 121, 131, 141 and a set of virtual home agents 107A-107E. The home network 101 and foreign networks 121, 131 and 141 can be connected by a core network 111. Each of these networks can be a local area network (LAN), a wide area network (WAN), such as the Internet, or a similar network. The mobile node 103 can be moved between any of the networks 101, 121, 131 and 141 and maintain a connection with a corresponding node over the network 111.

The mobile node 103, home agent node 105 and virtual home agents 107A-107E can be any type of computing devices or networking elements including laptop computers, routers, switchers, desktop computers, servers, handheld devices, console devices and similar computing and networking devices. The networks 101, 111, 121, 131 and 141 can include any combination of wired and wireless connections and any number of intermediate computers or networking devices.

In one embodiment, the mobile node 103 and home agent 105 implement the mobile Internet protocol version 6 (MIPv6) or similar communication protocol enabling the mobile node 103 to maintain connections (e.g., TCP connections) with corresponding nodes when moving between networks and when changing network connections. The virtual home agents 107A-107E are controlled by the home agent 105, which selects and directs the virtual home agents 107A-107E to perform home agent functionality thereby offloading these functions to the virtual home agents 107A-107E from the home agent 105 or sharing these functions with the virtual home agent 107A-107E in coordination with the home agent 105.

The use of these virtual home agents 107A-107E to provide any subset of the functionality of the home agent 105 is to improve the quality of service offered to the mobile node 103. By utilizing a virtual home agent 107A-107E in place of the home agent 105, the virtual home agent 107A-107E can have a greater proximity to the mobile node 103. As a result, a higher quality of service can be offered to the mobile node 103 in cases where the home agent 105 is not as close to the mobile node and corresponding node 109 as a virtual home agent 107A-107E. Improved quality of service can include increased bandwidth, lower latency and similar improved communication metrics between the mobile node 103 and the corresponding node 109 using the virtual home agent 107A-107E in comparison to using the home agent 105.

The mobile node 103 can be connected to a home agent 105 regardless of the current network that a mobile node 103 is connected to in order to keep the home agent 105 up to date on the current location of the mobile nodes 103 so that the home agent 105 can determine which virtual home agent 107A-107E should be utilized to provide home agent services to the mobile node 103. At any given time, the mobile node 103 can be connected to multiple virtual home agents 107A-107E in addition to being connected to the home agent 105. Each network can include a NAT66 to perform network address translation such that data packets destined for the mobile node 103 can be properly translated to its local address in the foreign network 121 and 141. Each virtual home agent 107A-107E can also have a secure connection to the home agent 105 to receive communication and direction from the home agent 105 as well as to keep the home agent 105 informed of its status and location.

Figure 2:
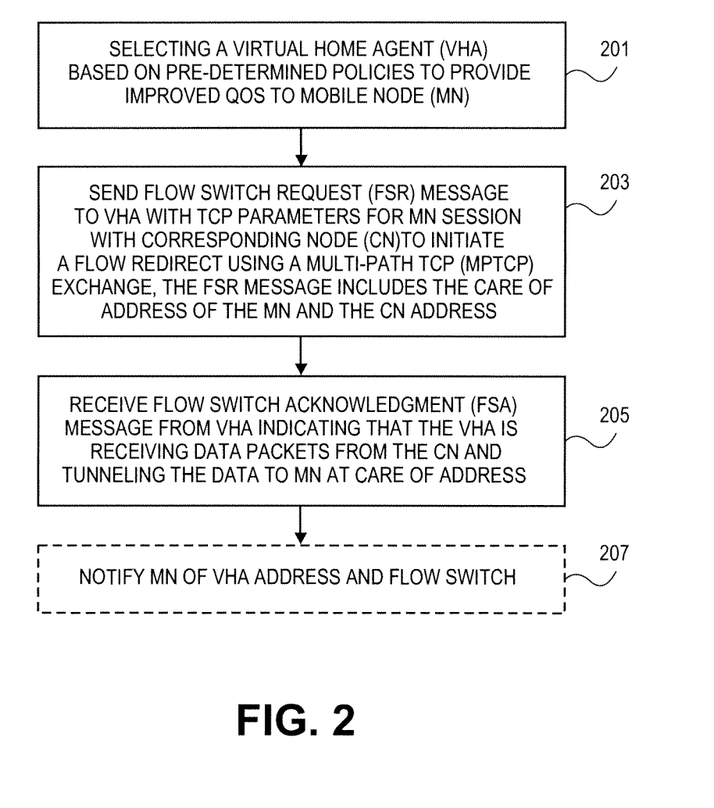
FIG. 2 is a flowchart of one embodiment of a process for configuring a virtual home agent performed by the home agent.

FIG. 2 is a flowchart of one embodiment of the process performed by the home agent for configuring a virtual home agent. In one embodiment, the process is triggered in response to a home agent receiving a binding update message from a mobile node indicating that the mobile is connected to a new or different foreign network. The home agent then can analyze the location of the mobile node to determine whether or not a virtual home agent can provide home agent services to the mobile node with an improved quality of service (Block 201). The analysis can include an application of predetermined policies including a comparison of address prefixes, quality of service metrics, location or topology information and similar information maintained by the home agent to determine whether each available virtual home agent would provide a higher level or an improved quality of service. The home agent may select a single virtual home agent or a set of virtual home agents to delegate or assign home agent services.

After selecting a virtual home agent, the home agent sends a flow switch request message to the selected virtual home agent with transmission control protocol (TCP) parameters for the session between the mobile node and the corresponding node (Block 203). The flow switch request message initiates a flow redirect using a multi-path TCP exchange. Multi-path TCP is an enhancement of TCP that enables the sending of a particular packet over a particular path, Standard TCP congestion control algorithms are run for each path such that each path has its own congestion window that reflects the available bandwidth for the path. Multi-path TCP can send many packets over paths with a large congestion window and/or a small round-trip-time (RTT) and fewer packets over paths that have a small window and/or a large RTT. This way, a multi-path TCP can automatically- and quickly-adjust to congestion in the network, moving traffic away from congested paths and toward uncongested paths. In this case, the flow switch request initiates the creation of new multi-path TCP paths that traverse the virtual home agent.

The flow switch request message also includes a care-of address of a mobile node and a corresponding node address. Multi-path TCP enables the setting up of multiple sub-flows between two nodes. A flow is a stream of TCP packets sent between two nodes. A sub-flow is a sub-set of the stream of TCP packets from the flow sent over a particular path that is started and terminated similar to a regular TCP connection. Sub-flows are terminated as regular TCP connections. In other words, a multi-path TCP connection is a set of one or more sub-flows that are combined to provide a single multi-path TCP service to an application at a host. Multi-path TCP utilized in this context sets up a new flow or sub-flow between the mobile node and the corresponding node that passes through the virtual home agent instead of the home agent.

After sending the flow switch request message the home agent expects and receives the flow switch acknowledgement message from the virtual home agent indicating that the virtual home agent is receiving data packets from the corresponding node over a newly established multi-path TCP connection and is tunneling the data received from the corresponding node to the mobile node at its care-of address (Block 205).

In one embodiment, in response to receiving the flow switch acknowledgment message the home agent notifies the mobile node of the address of the virtual home agent that implements the flow switch (Block 207). In other embodiments, the home agent can notify the mobile node of the virtual home agent address in a binding acknowledgement message, which is returned to the mobile node in response to receiving the binding update message. Other information about the virtual home agent or new TCP flow can also be provided including TCP parameters for the new TCP flow. In other embodiments, the mobile node is unaware of the virtual home agent. The mobile node may tunnel data traffic to the virtual home agent, but is unaware that the virtual home agent is servicing the tunnel instead of the home agent. In addition, other home agent services can also be delegated or assigned to the virtual home agent.

Figure 3:
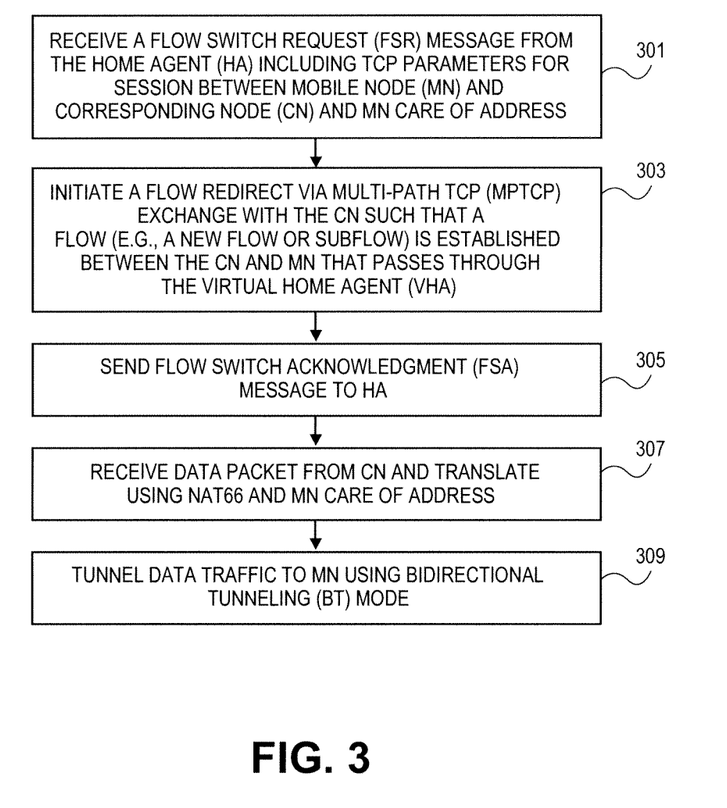
FIG. 3 is a flowchart of one embodiment of the process of configuring a virtual home agent performed by the virtual home agent.

FIG. 3 is a flowchart of one embodiment of a process for configuring a virtual home agent performed by the virtual home agent. In one embodiment, this process is initiated by the receipt at the virtual home agent of a flow switch request message from the home agent (Block 301). In response to receiving the flow switch request message, the virtual home agent can request an establishment of a new flow or sub-flow of the TCP session between the corresponding node and the mobile node, where the new flow or sub-flow passes through the virtual home agent. The new flow or sub-flow can be established using multi-path TCP exchange and through the use of the supplied TCP parameters of the existing TCP session between the mobile node and the corresponding node as well as the care-of address of the mobile node received in the flow switch request message.

Establishing the new flow or sub-flow redirects data packets from the corresponding node to the virtual home agent. Upon completion of the flow redirection using multi-path TCP exchange, the virtual home agent sends a flow switch acknowledgement message to the home agent (Block 305). Sending the flow switch acknowledgement message indicates that the establishment of the new flow or sub-flow multi-path TCP exchange has been successful and that data is now being received by the virtual home agent from the corresponding node, which in turn is being tunneled to the mobile node.

When data traffic is received from the corresponding node at the virtual home agent, the virtual home agent utilizes a Network Address Translation (NAT66) to translate the incoming data such that it can be tunneled to the mobile node care-of address (block 307). The virtual home agent then tunnels data traffic from the corresponding node to the mobile node using a bi-directional tunneling mode (block 309). The mobile node implements mobile Internet protocol version 6 (MIPv6) and thus is capable of receiving a bi-directional tunnel as though it is coming from the home agent. In some embodiments, data traffic is received from the mobile node at the virtual home agent over the bi-directional tunnel and forwarded to the corresponding node.

Figure 4:
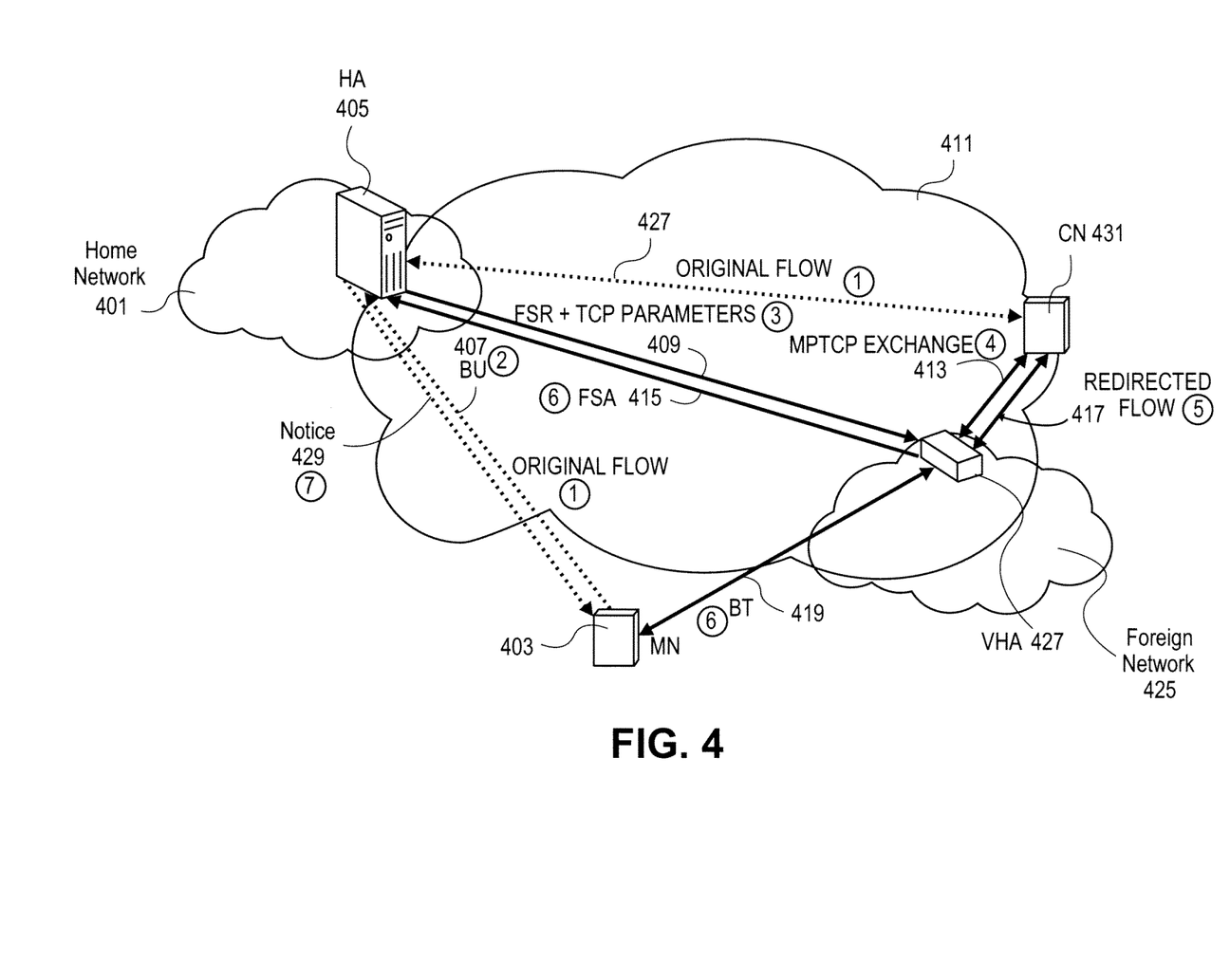
FIG. 4 is a diagram of one embodiment of the split home architecture messaging.

FIG. 4 is a diagram of one embodiment of a system architecture showing the exchange of messages in the split home architecture. In the example architecture, an existing or original flow (1) exists between the corresponding node 431 and mobile node 403 that passes through the home agent 405. Subsequently, the mobile node 403 sends (2) a binding update message 407 to the home agent 405 indicating the connection of the mobile node 403 to a new network such as a foreign network 425. The home agent 405 in home network 401 determines whether or not a virtual home agent 427 can provide a better quality of service to the mobile node 403.

Upon selection of a virtual home agent 427 the home agent 403 generates and sends (3) a flow switch request message 409 including the TCP parameters of the communication between the mobile node 403 and the corresponding node 431. The virtual home agent 427 receives the flow switch request messaging 409 and TCP parameters and initiates (4) a new flow or sub-flow between the corresponding node 431 and mobile node 403 using multi-path TCP exchange 413 with the corresponding node 431 whereby the communication between the mobile node 403 and the corresponding node 431 that currently passes through the home agent 405 is either redirected or included in a secondary sub-flow (5) through the virtual home agent 427. The redirected flow 417 passes through the virtual home agent 427 in foreign network 425 and then is tunneled to the mobile node 403 using bi-directional tunneling 419. After the flow has been redirected and the tunnel between the mobile node 403 and virtual home agent 427 has been established, the virtual home agent 427 notifies (6) the home agent 405 with the flow switch acknowledgement message 415.

In one embodiment, the home agent 405 residing in the home network 401 notifies (7) the mobile node 403 of the address and similar information about virtual home agent 427. This can also be accomplished through a binding acknowledgement message in response to receiving the binding update message 407. However, in other embodiments, this notification is not provided and the mobile node 403 is unaware of the existence of the virtual home agent 427. Rather, the mobile node 403 assumes the bi-directional tunnel is serviced by the home agent 405.

Figure 5:
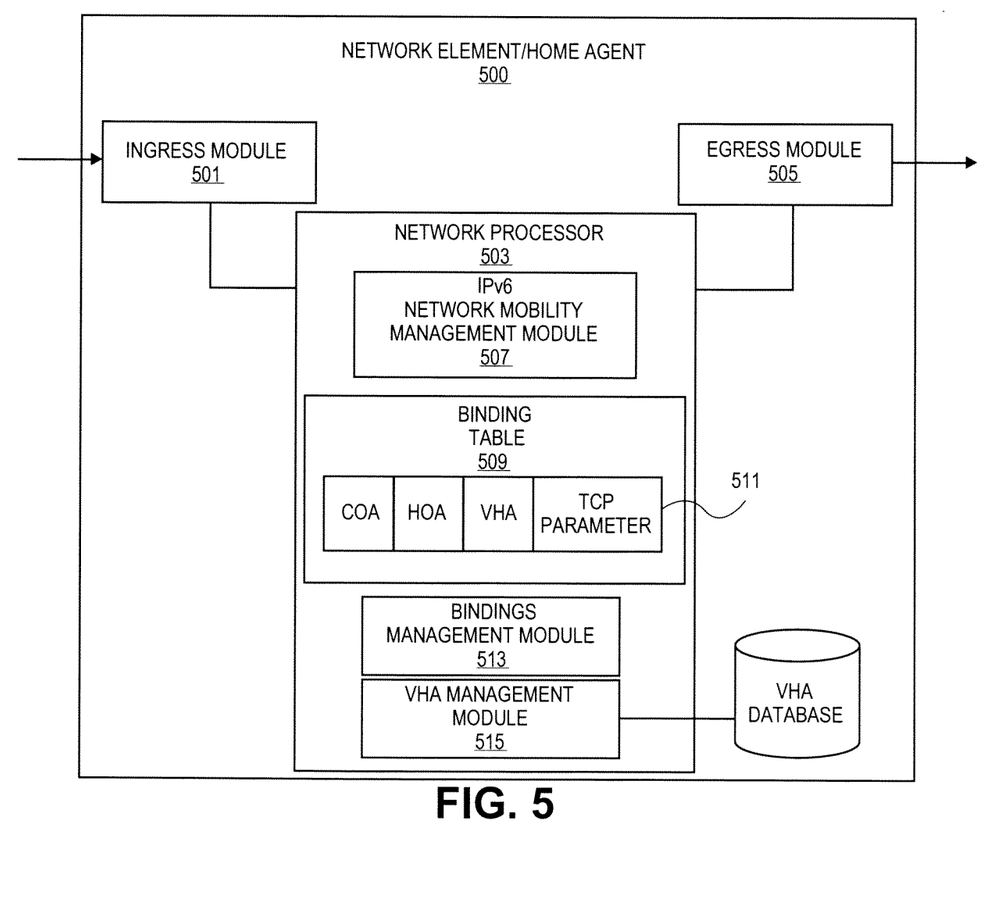
FIG. 5 is a diagram of one embodiment of a home agent.

FIG. 5 is a diagram of one embodiment of a network element serving as the home agent node. The network element 500 can include an ingress module 501, an egress module 505 and a network processor 503. The ingress module 501 can handle the processing of data packets being received by the network element at the physical link and data link level. The egress module 505 handles the processing and data packets being transmitted by the network element at the physical link and data link level. The network processor 503 handles the routing, forwarding and higher level processing of the data traffic. The network processor 503 can execute or include an IPv6 network mobility management module 507, bindings table 509, bindings management module 513 and a virtual home agent management module 515.

The network mobility management module 507 receives data traffic from the mobile node and forwards that data traffic to a corresponding node when a virtual home agent has not been assigned. The mobility management module implements the basic mobile IPv6 functionality including supporting BT modes, multi-path TCP, tunneling and address translation. The network mobility management module 503 also receives data traffic from the corresponding node and forwards it to the mobile node. Any combination of these functions can be delegated to a virtual home agent.

The bindings management module 513 receives binding update messages from the mobile node when the mobile node connects to foreign networks. Each of the binding update messages includes an IPv6 care-of address assigned by the foreign network to which the mobile node is currently connecting. The bindings management module 213 is further configured to send a binding request message, responsive to each of the binding update messages that is received, to the home NAT node to bind the mobile node's home address with a prefix of a foreign NAT node in that foreign network at the home NAT node.

The bindings management module 513 also receives binding update messages or requests from the virtual home agent (VHA) management module 515. The bindings management module 513 updates and maintains binding entries 511 in the binding table 509. These binding entries 501 correlate the care-of address (COA), home agent address (HOA), virtual home agent address (VHA), corresponding node address (CN), TCP parameters and similar data to be used for forwarding data traffic between a mobile node and corresponding node as well as tracking the delegation of home agent services to a virtual home agent.

A virtual home agent (VHA) management module 515 selects a virtual home agent and performs the transfer of home agent services as described above in regard to FIG. 2. A virtual home agent database 521 or similar storage system or data structure tracks the properties, topology and similar virtual home agent information needed to select and transfer services to the available virtual home agents. The virtual home agent database can also be utilized to track the assignment of home agent services to each virtual home agent.

Figure 6:
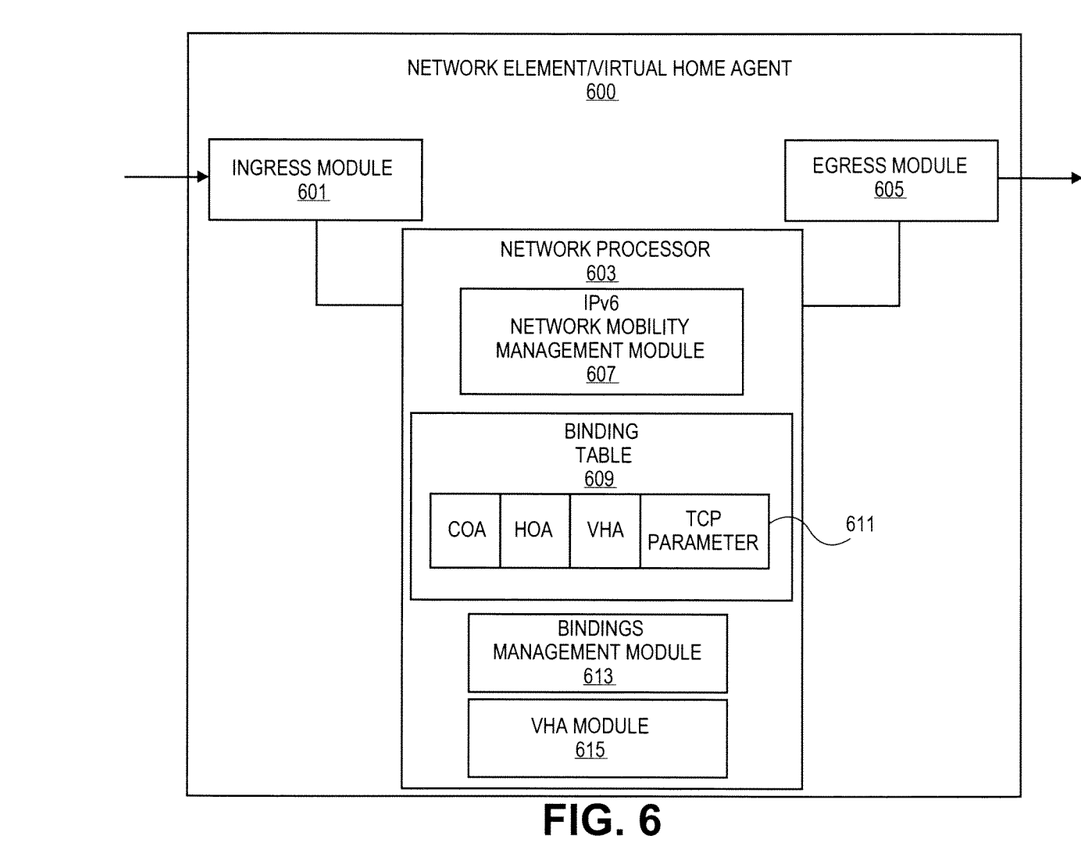
FIG. 6 is a diagram of one embodiment of a virtual home agent.

FIG. 6 is a diagram of one embodiment of a virtual home agent. The network element 600 can include an ingress module 601, an egress module 605 and a network processor 603. The ingress module 601 can handle the processing of data packets being received by the network element at the physical link and data link level. The egress module 605 handles the processing and data packets being transmitted by the network element at the physical link and data link level. The network processor 603 handles the routing, forwarding and higher level processing of the data traffic. The network processor 603 can execute or include an IPv6 network mobility management module 607, bindings table 609, bindings management module 613 and a virtual home agent module 615.

The network mobility management module 607 receives data traffic from the mobile node and forwards that data traffic to a corresponding node when a virtual home agent has not been assigned. The mobility management module implements the basic mobile IPv6 functionality including supporting BT, multi-path TCP, tunneling and address translation. The network mobility management module 603 also receives data traffic from the corresponding node and forwards it to the mobile node.

The bindings management module 613 receives binding update messages or requests from the virtual home agent module 615. The binding management module 613 updates and maintains binding entries 611 in the binding table 609. These binding entries correlate the care-of address (COA), home agent address (HOA), virtual home agent address (VHA), corresponding node address (CN), TCP Parameters and similar data to be used for forwarding data traffic between a mobile node and corresponding node as well as tracking the home agent services to be performed for each mobile node or home agent node.

A virtual home agent (VHA) module 615 receives requests from home agents to transfer home agent services to the virtual home agent as described above in regard to FIG. 3. The virtual home agent module 615 process flow switch requests messages from the home agent and redirects data traffic from the corresponding node to the virtual home agent using MPTCP exchange to establish a new flow or sub-flow for the session between the mobile node and corresponding node. The new flow or sub-flow passes through the virtual home agent. The virtual home agent module and network mobility management module can tunnel and forward data traffic between the mobile node and corresponding node as set forth above in regard to FIGS. 2 and 3.

Thus, a method, system and apparatus for enabling a split home agent architecture has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented in a network element in a wide area network, the network element functioning as a home agent (HA) for a mobile node (MN) communicating with a corresponding node (CN) using Mobile Internet Protocol version 6 (MIPv6), the method comprising the steps of:

selecting by the HA a virtual home agent (VHA) in the network to provide home agent services to the MN with a better quality of service than the HA based on pre-defined policies;

sending a flow switch request (FSR) message to the selected VHA, the FSR message including transmission control protocol (TCP) parameters for a session between the MN and CN and the FSR message including a care-of address for the MN and an address of the CN, the FSR message to initiate a flow redirection at the VHA using multi-path TCP exchange; and receiving a flow switch acknowledgement (FSA) message from the VHA indicating that the VHA is receiving data packets from the CN and tunneling the data packets to the MN at the care-of address, whereby the MN receives a better quality of service when communicating with the CN through the VHA than through the HA.

2. The method of claim 1, further comprising the steps of: notifying the MN of an address of the VHA to direct the MN to tunnel data packets to the CN through the VHA.

3. The method of claim 1, wherein the predefined policies are one or more of a comparison of the care-of address of the MN with each address of a plurality of virtual home agents including said virtual home agent, the use of topological information, quality of service requirements, bandwidth metrics and latency metrics.

4. A method implemented in a network element in a wide area network, the network element functioning as a virtual home agent (VHA) for a mobile node (MN) communicating with a corresponding node (CN) using Mobile Internet Protocol version 6 (MIPv6), the method comprising the steps of:

receiving a flow switch request (FSR) message from a home agent (HA) including transmission control protocol (TCP) parameters for a session between the MN and (CN), the FSR message including a care-of address of the MN and an address of the CN;

initiating a flow redirection using multi-path TCP (MPTCP) exchange with the CN to establish a flow between the MN and CN that passes through the VHA;

sending a flow switch acknowledgement (FSA) message to the HA upon establishment of the flow;

receiving data packets of the flow at the VHA from the CN;

translating the data packets using network address translations NAT66 and the care-of address of the MN; and tunneling the data packets to the MN using bi-directional tunneling (BT) mode, whereby the MN receives a better quality of service when communicating with the CN through the VHA than through the HA.

5. The method of claim 4, wherein the tunneling is Internet Protocol in Internet Protocol tunneling.

6. The method of claim 4, further comprising the steps of: receiving data packets from the mobile node using BT mode; and forwarding the data packets from the mobile node to the corresponding node.

7. The method of claim 4, wherein the flow is any one of a new flow or a sub-flow.

8. A network element configured to function as a home agent (HA), the network element configured to communicate with a mobile node (MN), a corresponding node (CN) and a plurality of virtual home agents (VHAs) over a wide area network, the network element comprising:

an egress module configured to receive data packets over the network;

an ingress module configured to transport the data packets over the network; and a network processor communicatively coupled to the ingress module and egress module, the network processor configured to execute a network mobility management module, a binding management module and a virtual home agent module, the network mobility management module configured to manage a communication session between the mobile node and the corresponding node, the binding management module communicatively coupled to the network mobility management module, the binding management module configured to maintain a binding table including a set of binding entries, each binding entry including a correlated care-of address for the MN, an address of the HA, an address of the CN and an address of the VHA, the binding management module configured to create and update the set of binding entries, the virtual home agent management module configured to select a VHA from the plurality of VHAs to provide a home agent service to the MN, the selection based on pre-defined policies, the virtual home agent management module to send a flow switch request (FSR) message to the selected VHA, the FSR message including transmission control protocol (TCP) parameters of a session between the MN and the CN, the FSR message to cause the selected VHA to establish a flow between the MN and CN that passes through the selected VHA using multi-path TCP (MPTCP) exchange, the virtual home agent management module to receive a flow switch acknowledgement (FSA) message from the selected VHA, whereby the MN receives a better quality of service when communicating with the CN through the selected VHA than through the HA.

9. The network element of claim 8, further comprising: a virtual home agent database to store information about location or topology of the plurality of VHAs.

10. The network of claim 8, wherein the pre-defined policies include one or more of a comparison of the care-of address of the MN with an address of each of the plurality of VHAs, the use of topological information, quality of service requirements, bandwidth metrics and latency metrics.

11. The network element of claim 8, wherein the virtual home agent management module is configured to notify the mobile node of the selected VHA.

12. A network element configured to function as a virtual home agent (VHA), the network element in communication with a mobile node (MN), a corresponding node (CN) and a home agent (HA) over a wide area network, the network element comprising:

an ingress module configured to receive data packets over the network;

an ingress module configured to transport the data packets over the network; and a network processor communicatively coupled to the ingress module and egress module, the network processor configured to execute a network mobility management module, a binding management module and a virtual home agent module, the network mobility management module configured to manage a communication session between the MN and the CN, the binding management module communicatively coupled to the network mobility management module, the binding management module configured to maintain a binding table including a set of binding entries, each binding entry including a correlated care-of address for the MN, an address of the HA, an address of the CN and an address of the VHA, the binding management module configured to create and update the set of binding entries, a virtual home agent module to provide a home agent service to the MN, the virtual home agent module to receive a flow switch request (FSR) message from the HA including TCP parameters of a multi-path TCP (MPTCP) session between the MN and CN, a care-of address of the MN, and an address for the CN, the virtual home agent module configured to use multi-path TCP exchange to establish a flow from the CN to the MN that passes through the VHA, to send a flow switch acknowledgement (FSA) message to the HA and to tunnel data traffic from the CN to the MN, whereby the MN receives a better quality of service when communicating with the CN through the selected VHA than through the HA.

13. The network element of claim 12, wherein the virtual home agent module and network module management module tunnel data from the CN to the MN using Internet protocol in Internet protocol tunneling.

14. The network element of claim 12, wherein the virtual home agent module and network mobility management module receive data packets from the MN and forward the data packets to the CN.

* * * * *

UNITED STATES PATENT AND TRADEMARK OFFICE
CERTIFICATE OF CORRECTION

PATENT NO. : 8,428,024 B2
APPLICATION NO. : 12/969229
DATED : April 23, 2013
INVENTOR(S) : Haddad Page 1 of 1

It is certified that error appears in the above-identified patent and that said Letters Patent is hereby corrected as shown below:

In the Specification

In Column 7, Line 15, delete "path," and insert -- path. --, therefor.

In the Claims

In Column 12, Line 34, in Claim 10, delete "network" and insert -- network element --, therefor.

Signed and Sealed this
Eighteenth Day of February, 2014

Michelle K. Lee
*Deputy Director of the United States Patent and Trademark Office*